April 28, 1959    R. PFEIFFER ET AL    2,883,761
TOOL GAUGE
Filed Oct. 31, 1957
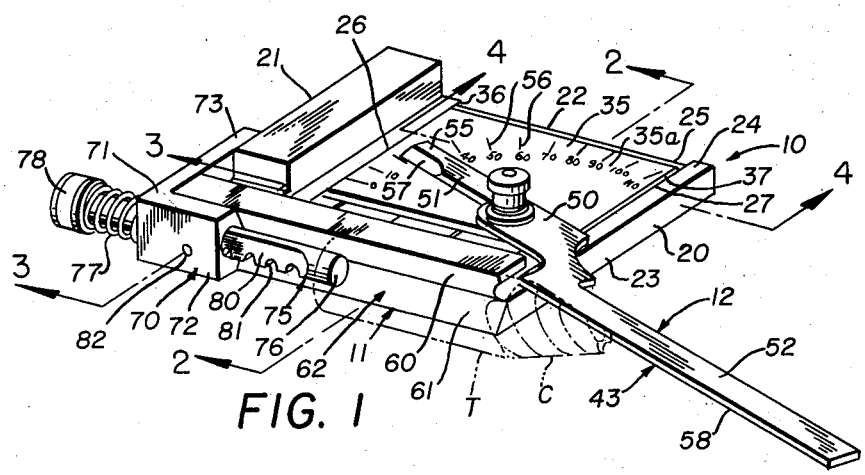
INVENTORS
RICHARD PFEIFFER
WEBB R. LAZARITES
BY
J. William Freeman
ATTORNEY United States Patent Office 2,883,761
Patented Apr. 28, 1959

2,883,761

TOOL GAUGE

Richard Pfeiffer, Akron, and Webb R. Lazarites, Canton, Ohio

Application October 31, 1957, Serial No. 693,648

9 Claims. (Cl. 33—201)

This invention relates to tool gauges in general and in particular has reference to new and improved types of tool gauges wherein the angularity of a tool's cutting edge can be accurately determined.

In the art of sharpening cutting tools, it has long been known that the angle of inclination of the cutting edge to the work is an important factor. For example, in angular milling cutters, wherein the shank is revolved about the axis of rotation, it has long been desirable to have the revolving cutting edges disposed at a relatively small angle with respect to the axis of rotation, with this angle normally being in the nature of five to ten degrees, in the case of such tools.

In the past, the correctness of this cutting angle has at best, because of the configuration of the reaming tool per se, been difficult to determine. In this regard, tools of this general type that have been found usable for measuring the cutting angle, have invariably been constructed so as to be limited to use with one particular shank thickness of tool with the result that shanks of varying diameters cannot be measured by the same instrument. Additionally, the overall elongate length of tools of this type will vary, with the result that the known prior art gauges cannot normally be used to measure the angle on different lengths of tools.

It has been found that improved results can be obtained in this regard by providing a tool supporting surface of variable longitudinal length upon which the tool to be checked can be firmly positioned. It has been further found that if this positioned tool is measured by a pointer arm that is shiftable towards and from the supporting surface, as well as being angularly variable with respect thereto, that different sizes and lengths of tools can have their cutting angles measured with satisfactory results.

It accordingly becomes a principal object of this invention to provide an improved type of tool gauge that is characterized by the fact that the same can be utilized to measure the angular disposition of the cutting edge of a plurality of cutting tools having different diameters and lengths.

It is a still further object of this invention to provide a measuring gauge for cutting tools of this general character, that is characterized by the fact that the same is of simplified construction while being efficient for usage with a wide range of sizes and shapes of tools.

These and other objects of the invention will become more apparent upon the reading of the following brief specification, considered and interpreted in the light of the accompanying drawings.

Of the drawings:

Figure 1 is a perspective view of the improved tool gauge and showing in phantom lines, a tool positioned thereon.

Figures 2, 3 and 4 are sectional views taken on the lines 2, 2, 3, 3, and 4, 4 of Figure 1.

Referring now to the drawings, it will be seen that the improved tool gauge, generally designated by the numeral 10, includes a tool supporting edge portion 11 and a pointer mechanism generally indicated by the numeral 12; the arrangement being such that a tool T, positioned on tool supporting edge 11 as shown in phantom lines in Figure 1, can have the angular disposition of its cutting edge C determined by the pointer mechanism 12 as will presently be described.

To this end the tool gauge 10 includes a plate member 20 that is preferably shown as being of substantially rectangular configuration so as to include opposed edge surfaces 20 and 21 as well as an interconnecting edge surface 22 that is opposed from the tool supporting edge 11 as is clearly shown in Figures 1 and 2.

For the purpose of description, the plate member 20 also includes opposed planar faces indicated generally by the numerals 23 and 24 with the surface 23 being the undersurface (Figure 1) of gauge 10, while the surface 24 is exposed for association with the pointer means 12 as will now be described.

Accordingly, and to this end, the surface 24 is shown undercut to define a transverse way 25 that extends inwardly from edge portion 22 towards the tool supporting surface 11, with inclined side surfaces 26 and 27 (see Figure 4) defining the width extremity of the way 25. In this regard, the way 25 is further undercut with a groove 28 (Figures 2 and 4) within which may be received an arched spring 29, the opposed ends of which bear against endwall segments 30 and 31 of groove 28 as is clearly shown in Figure 2.

Receivable within the just-described way 25 in shiftable relationship therewith is a support plate 35, that is preferably of thin flat rectangular configuration so as to include opposed edge surfaces 36 and 37 that respectively coact with the previously described surfaces 26 and 27 of way 25 for the purpose of retaining the plate 35 within the way 25 as is shown in Figure 4 of the drawings. In this manner, the plate 35 may shift towards and from the tool supporting edge 11 as is shown in the full and chain-dotted line positions of Figure 2.

Considering next the pointer means 12, it will be seen that the support plate 35 is apertured, as at 40, for reception therein of a stud bolt 41, that has a shank portion 42 about which may be received the pointer arm 43, with retention and clamping of the pointer arm 43 in any desired angular position being facilitated by threads 44 and nut 45, and with the usual washer 46 being employed in known fashion in this regard. With reference next to the structure of the pointer arm 43, it will be seen that the same is of thin, flat and elongate configuration so as to include a base portion 50, a pointer portion 51 and a straight edge portion 52, with pivoting of the overall arm 43 occurring as a result of the pivotal connection between stud 41 and aperture 54 (Figure 2), while straight edge portion 52 coacts with the cutting edge C of tool T as shown in Figure 1. Additionally, the angularly inclined face 55 (Figure 1) of pointer segment 51 is arcuately movable across arcuately spaced indicia 56, 56 that are provided on the exposed face 35a of support plate 35.

In this manner, the edge surfaces 57 and 58, that are provided on portions 51 and 52 respectively of pointer arm 43 will be disposed in parallel so that upon obtaining a reading on edge surface 51, it will be known that the edge surface 58 is disposed at the same exact angle with respect to the tool supporting edge 11. Preferably in this regard, the portion 52, including edge surface 58, is offset with respect to the point of pivotal connection between arm 43 and support plate 35. In this manner, a greater angular disposition will be possible than if a straight pointer arm were employed.

Considering next the tool supporting edge surface 11, it will be seen that the same is preferably of thickened configuration so as to include a planar surface 59 that is in spaced parallelism with the surface 23 as is clearly shown in Figures 2 and 3 of the drawings. Additionally, the extreme outer edge surface of tool supporting edge 11 is defined by inclined surfaces 60 and 61 that interconnect each other to define the V-shaped groove that is indicated generally by the numeral 62 in Figure 2 of the drawings. In this manner, a varying number of tools, having different diameters, can be firmly seated against the walls of the V-shaped groove 62 so as to be in two line contact therewith. Clamping means (not shown) could be employed in this regard to insure continuation of contact between the tool and the edge V-groove 62 if desired.

For the purpose of varying the length of longitudinal support provided by edge surface 11, the same is shown having associated therewith an adjustable stop means that is indicated generally by the numeral 70 in Figure 1 of the drawings. The stop means 70 include an L-shaped block 71 having legs 72 and 73 that are respectively secured to tool engaging surface 11 and edge surface 21, as shown in Figure 1 of the drawings. Additionally, the leg section 72 is provided with a longitudinal bore 74 within which may be received a pin member designated by the numeral 75, with this pin 75 having a projecting axial end 76 that overlies the surfaces 60 and 61 and bears against the axial end of a tool T received against the tool supporting surface 11. The pin 75 is normally urged upwardly and to the left of Figure 1 by use of a spring 77 that has its opposed ends bearing against head 78 and block 71 as shown in Figure 1.

In order that the amount of projection of end 76 beyond block 70 may be selectively controlled, the pin 75 is shown undercut as as 80, with this undercut surface defining a plurality of transversely extending slots 81, 81, that define a series of teeth on the perimetric surface of pin 75. A pin 82 extending transversely of the leg portion 72 (see Figure 3) coacts with the just-described slots 81, 81 and thus serves to firmly position the axial end 76 at a predetermined degree of projection beyond the leg 72.

In use or operation of the improved tool gauge 10, it will first be assumed that the component parts have been assembled as indicated in Figure 1 with the pointer mechanism 12 being operatively associated with support plate 35 and with this sub-assembly being slideably positioned within way 25 as has been described.

At this point, a tool T can have its shank portion positioned against the V-groove 62 of tool supporting edge surface 11 and at this time, the adjustable stop means 70 may be operated to effectuate the proper amount of projection of end 76 therebeyond. In this regard, such adjustment of pin 75 could be achieved in the form shown, by first imparting clock-wise (Figure 1) rotation to the head 78 to effectuate turning of the same approximately 90°. At this point, the undercut surface 80 would pass over the pin 82 with the result that the entire pin 75 could be shifted axially of the leg 72. When the proper amount of projection has been obtained, the end 78 may be turned in the opposite (counter clock-wise Figure 1) direction so as to cause the selected slot 81 to be engaged with the pin 82 as is clearly shown in Figure 3.

At this point, it will be known what the desired angle of the cutting edge C is to be, and accordingly the nut 45 may be loosened and the edge 57 positioned on this graduation 56 that is indicative of such positioning, with the graduation being approximately 21° in the illustration of Figure 1. As a result of this, the edge surface 58 will also be inclined at 21° with respect to tool supporting surface 11 with the result that a tool positioned thereon can be engaged by the edge surface 58 to determine the accuracy of the grinding thereof. If the tool is ground to exactly 21°, the edge surface 58 will perfectly engage the same. If the tool is not properly ground, the edge surface 58 will not be in parallel with the cutting edge C, thus indicating that additional grinding is needed.

At this point, the tool can either be reground or used as indicated above.

It will be seen from the foregoing that there has been provided a new and novel type of improved tool gauge characterized by the use of a pointer mechanism that is shiftable both angularly and transversely of a tool supporting edge so as to facilitate accommodation of a large number of tools. It has been shown how the provision of a variable length tool supporting surface insures accurate measurement on various lengths of cutting tools with the result that the same gauge can be utilized with a great number of cutting tools.

It is to be understood that the invention includes the modification wherein the tool supporting edge surface is inclined to accommodate certain types of cutting tools having an axis of rotation inclined with respect to its shank portion. In such case a second arcuate scale could be provided or a notch could be provided on the pointer arm to facilitate obtaining of this reading.

While a full and complete disclosure of the invention has been made in accordance with the dictates of the patent statutes, it is to be understood that the invention is not intended to be so limited. Accordingly, where indicated equivalents may be substituted, and thus modifications of the invention may be resorted to without departing from the spirit hereof or the scope of the appended claims.

What is claimed is:

1. A tool gauge of the character described, comprising; a flat base plate having opposed marginal edge surfaces interconnecting opposed planar faces of said base plate; a way defined by one said planar face and extending transversely of said opposed marginal edge surfaces; a tool supporting surface defined by one said marginal edge surface; a support plate received in said way and being shiftable therein transversely of said opposed marginal edge surfaces; and a pointer arm pivoted to said support plate and having its free end projecting beyond the outline of said base plate; whereby said pointer will engage the projecting end of a tool having its shank received on said tool supporting surface.

2. A tool gauge of the character described, comprising; a flat base plate having opposed marginal edge surfaces interconnecting opposed planar faces of said base plate; a way defined by one said planar face and extending transversely of said opposed marginal edge surfaces; a tool supporting surface defined by one said marginal edge surface; a support plate received in said way and being shiftable therein transversely of said opposed marginal edge surfaces; and an elongate arm, pivoted to said support plate and having a straight edge surface projecting beyong the outline of said flat base plate whereby said straight edge surface of said arm will engage the projecting end of a tool having its shank received on said tool supporting surface.

3. A tool gauge of the character described, comprising; a flat base plate having opposed marginal edge surfaces interconnecting opposed planar faces of said base plate; a way defined by one said planar face and extending transversely of said opposed marginal edge surfaces; a tool supporting surface defined by one said marginal edge surface; a support plate received in said way and being shiftable therein transversely of said opposed marginal edge surfaces; and an elongate arm, pivoted to said support plate and having a straight edge surface projecting beyond the outline of said flat base plate whereby said straight edge surface of said arm will engage the projecting end of a tool having its shank received on said tool supporting surface; said straight edge surface of said arm being offset with respect to the point of pivotal connection between said arm and said support plate.

4. A tool gauge of the character described, comprising; a flat base plate having opposed marginal edge surfaces interconnecting opposed planar faces of said base plate; a way defined by one said planar face and extending transversely of said opposed marginal edge surfaces; a tool supporting surface defined by one said marginal edge surface; a support plate received in said way and being shiftable therein transversely of said opposed marginal edge surfaces; an elongate arm, pivoted to said support plate and having a straight edge surface projecting beyond the outline of said flat base plate whereby said straight edge surface of said arm will engage the projecting end of a tool having its shank received on said tool supporting surface; and means for determining the angular disposition of said straight edge surface of said arm with respect to said tool supporting edge surface.

5. A tool gauge of the character described, comprising; a flat base plate having opposed marginal edge surfaces interconnecting opposed planar faces of said base plate; a way defined by one said planar face and extending transversely of said opposed marginal edge surfaces; a tool supporting surface defined by one said marginal edge surface; a support plate received in said way and being shiftable therein transversely of said opposed marginal edge surfaces; an elongate arm, pivoted to said support plate and having a straight edge surface projecting beyond the outline of said flat base plate whereby said straight edge surface of said arm will engage the projecting end of a tool having its shank received on said tool supporting surface; and means for determining the angular disposition of said straight edge surface of said arm with respect to said tool supporting edge surface; said means including a protractor surface provided on said support plate and coacting with a surface of said arm that is parallel to said straight edge surface of said arm.

6. A tool gauge of the character described, comprising; a flat base plate having opposed marginal edge surfaces interconnecting opposed planar faces of said base plate; a way defined by one said planar face and extending transversely of said opposed marginal edge surfaces; a tool supporting surface defined by one said marginal edge surface; a support plate received in said way and being shiftable therein transversely of said opposed marginal edge surfaces; a pointer arm pivoted to said support plate and having its free end projecting beyond the outline of said base plate; whereby said pointer will engage the projecting end of a tool having its shank received on said tool supporting surface; and means for varying the effective longitudinal length of said tool supporting surface.

7. A tool gauge of the character described, comprising; a flat base plate having opposed marginal edge surfaces interconnecting opposed planar faces of said base plate; a way defined by one said planar face and extending transversely of said opposed marginal edge surfaces; a tool supporting surface defined by one said marginal edge surface; a support plate received in said way and being shiftable therein transversely of said opposed marginal edge surfaces; a pointer arm pivoted to said support plate and having its free end projecting beyond the outline of said base plate; whereby said pointer will engage the projecting end of a tool having its shank received on said tool supporting surface; and means for varying the effective longitudinal length of said tool supporting surface; said means including a pin member disposed in substantially parallel overlying relationship to said tool supporting edge surface and being shiftable thereon between a plurality of locked positions.

8. A tool gauge of the character described, comprising; a flat base plate having opposed marginal edge surfaces interconnecting opposed planar faces of said base plate; a way defined by one said planar face and extending transversely of said opposed marginal edge surfaces; a tool supporting surface defined by one said marginal edge surface; a support plate received in said way and being shiftable therein transversely of said opposed marginal edge surfaces; an elongate arm, pivoted to said support plate and having a straight edge surface projecting beyond the outline of said base plate whereby said straight edge surface of said arm will engage the projecting end of a tool having its shank received on said tool supporting surface; means for determining the angular disposition of said straight edge surface of said arm with respect to said tool supporting edge surface; and means for varying the effective longitudinal length of said tool supporting surface.

9. A tool gauge of the character described, comprising; a flat base plate having opposed marginal edge surfaces interconnecting opposed planar faces of said base plate; a way defined by one said planar face and extending transversely of said opposed marginal edge surfaces; a tool supporting surface defined by one said marginal edge surface; a support plate received in said way and being shiftable therein transversely of said opposed marginal edge surfaces; an elongate arm, pivoted to said support plate and having a straight edge surface projecting beyond the outline of said flat plate whereby said straight edge surface of said arm will engage the projecting end of a tool having its shank received on said tool supporting surface; means for determining the angular disposition of said straight edge surface of said arm with respect to said tool supporting edge surface; and means for varying the effective longitudinal length of said tool supporting surface; said means including a pin member disposed in substantially parallel overlying relationship to said tool supporting edge surface and being shiftable thereon between a plurality of locked positions.

References Cited in the file of this patent

UNITED STATES PATENTS

| | | |
|---|---|---|
| 609,895 | Mitchell | Aug. 30, 1898 |
| 1,119,022 | Lewis | Dec. 1, 1914 |
| 2,608,767 | Hall | Sept. 3, 1952 |
| 2,778,122 | Oleksin | Jan. 22, 1957 |